Patented Jan. 14, 1930

1,743,885

UNITED STATES PATENT OFFICE

DANIEL GARDNER, OF WEYBRIDGE, AND LEONARD TAVERNER, OF LONDON, ENGLAND; SAID TAVERNER ASSIGNOR TO SAID GARDNER

EXTRACTION OF IRON AND TITANIUM COMPOUNDS FROM TITANIUM ORES

No Drawing.  Application filed August 6, 1923.  Serial No. 656,130.

This invention relates to and has for its object an improved method of extracting the iron in metallic form and titanium compounds from ilmenite, beach-sands (rich in titanium oxide, ferrous oxide) and other sources.

Hitherto difficulties have been encountered in the separation of the iron from the titanium, and the presence of either of these metals as impurities in the other considerably reduces their market value.

The present invention overcomes the difficulties hitherto encountered, and with this object, broadly consists in an improved process for extracting iron and titanium compounds from titanium ores in which the iron therein is reduced during the reaction in such manner that it contains but little titanium and the titanium compounds form a slag which is practically free from iron.

In carrying the invention into effect by way of example, the two principal substances in the ilmenite, FeO and $TiO_2$, are separated by reducing the iron in such manner that the titanium compound form a slag (the nature of which depend upon substances added as a slagging material) which slag is practically free from iron. The metal obtained only contains the small amount of titanium required, (0.01% to 1.0%) for the success of the process. Usually 0.02% to 0.1% is sufficient. Care is taken that the slag is freed as far as possible (say under 0.02%) from iron, as the latter is detrimental to the titanium compound formed, and can only be eliminated with great difficulty. The presence of small amounts of titanium in the iron formed, however, is not objectionable. The titanium or its compounds can be easily removed from the metal, but this is not deemed advisable, as its presence tends to eliminate impurities both in the iron and at a later stage in the steel, if such be produced.

The reducing agent is preferably chosen after carefully considering the specific gravity of the raw materials used, the specific gravities of the products resulting from the melting operations, the melting points of the initial ingredients, and the melting points of the slag and metal obtained, as it has been ascertained that the greater the difference between the specific gravity of the slag and the alloy obtained, the better the results. In the "sphene" case referred to herein the specific gravity of the slag is about 3.5, while the specific gravity of the metal is about 7.0.

Another point to observe is that it is preferable to limit the choice to such substances as contain iron or titanium so that the introduction of undesirable substances into the charge is entirely or almost entirely eliminated. For example, compounds which satisfy this requirement are ferro-silicon, of high silicon content, ferro-titanium of high titanium content, titanium silicide, calcium silicide and other silicides. The reducing agent used is chosen after consideration of the required characteristics of the slag; for example, it is useful to add to the ferro-silicon or to the silicide used some powdered metal containing the metal desired in the slag. For instance, if it is desired to obtain a slag having the formula $Al_2O_3.TiO_2.SiO_2$, it is necessary to introduce as reducing agent a mixture of ferro-silicon and metallic aluminum, in the proportions required to satisfy the said formula. If a slag with magnesium titanate is desired containing silica in "sphene" proportions, and having the formula $MgO.TiO_2 SiO_2$. (which corresponds to the natural titanate of magnesium "Geikielite" with addition of some silica) then ferro-silicon mixed with metallic magnesium would be used. The composition of the slag should preferably be calculated by using molecular proportions, so that it possesses a low melting point, is of stable composition, and has some practical application. In the calculations, allowance should be made for a small loss, and any impurities in the materials used.

To meet these requirements, it is advisable to refer to the work of nature, in which certain definite products with well defined formulæ are present in naturally occurring minerals. In addition to silicate and titanate of calcium, titanate or "sphene" may be considered amongst such stable compounds. The latter has a general formula $CaO.SiO_2.TiO_2$, a comparatively low melting point of 1221° C., and a specific gravity of about 3.5.

If this particular compound is required for commercial reduction, and the latter is effected, say by ferro-silicon, (rich in silicon, M. P. under 1600° C., sp. gr. 2.75) and ilmenite (M. P. 1150° C. sp. gr. 5.0–7.5), lime being added for the slag and the whole process carried out in a furnace having a suitable lining. A basic lining is usually best for melting and reducing titanium iron ores. A dolomite lining would do well for the "sphene" reaction referred to herein. As a rule, the choice of lining depends upon the slag required.

As a specific example of the proportion of the ingredients in a reaction of the "sphene" type referred to, the following charge is used:—

| | Parts |
|---|---|
| Ilmenite | 3040 |
| Ferro-titanium | 75 |
| Lime | 1120 |
| Quartz | 600 |

The ferro-titanium referred to is that containing over 20 per cent of titanium. In practice, the charge indicated is melted in an electric furnace, and when molten, 310 parts of ferro-silicon are added to reduce the iron. The products obtained from the operation are a slag of the "sphene" type with a melting point of about 1221° C. and a metallic iron with a low titanium content. If the process is carried out, for example, in a suitably lined crucible placed in a hot furnace, a quick reaction occurs at a temperature of about 1600° C. to 1650° C., the slag obtained is of commercial value, as it can, after the removal of iron, be used for manufacturing titanium paints of high quality.

A typical commercial formula for the reaction is

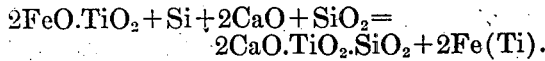
$$2FeO.TiO_2 + Si + 2CaO + SiO_2 = 2CaO.TiO_2.SiO_2 + 2Fe(Ti).$$

Alternatively, other stable titanium compounds may be used in the "sphene" or non-"sphene" proportions for the slag formation. For example, by using barium silicide (or barium oxide and a silicide, say ferro-silicon), barium silicate and barium titanate are obtained in the slag. Alternatively, by using other corresponding silicides, other slags are obtainable, containing, for example, manganese silicate and manganese titanate, magnesium silicate and magnesium titanate, aluminum silicate and aluminum titanate, zirconium silicate and zirconium titanate, thorium silicate and thorium titanate.

With all the titanium combinations, a stable slag is obtained, which usually has a pronounced blue colour.

To further purify the slag for use, for example, in a titanium paint pigment, the slag resulting from the reduction is returned into the furnace and heated until the proper colour is reached, and to eliminate impurities such as iron. To assist in the further elimination of these impurities, if desired, a small amount of one of the reducing agents referred to earlier in the specification may be introduced into the charge, usually 1 or 2 per cent of the total charge being sufficient. The proportions of reducing agent so added should be such that they satisfy the formula of the slag, and in both "sphene" and non-"sphene" cases it is desirable to work with molecular proportions. The introduction of further reducing agent into the slag should also be made after analyses of the latter, as in this way better control of the colour is obtained.

The foregoing methods have been given by way of example only, and as it is obvious that a process on the lines indicated may be effected without departing from the spirit of the invention, we wish it to be understood that we do not limit the scope of our invention to the particular examples given.

We claim:

1. A process of obtaining metallic iron and useful compounds of titanium from titanium ores which comprises treating said ores at an elevated temperature with a binary compound of an element of the fourth group of the periodic system, which compound acts as a reducing agent at said elevated temperatures, to form titanium slag substantially free from iron and to form metallic iron, and regulating the proportion of the binary compound added to obtain a titanium slag containing metallic oxides in monomolecular proportions.

2. A process of obtaining metallic iron and useful compounds of titanium from titanium ores which comprises treating said ores at an elevated temperature with a binary compound of an element of the fourth group of the periodic system, which compound acts as a reducing agent at said elevated temperatures and treating said ores with a non-ferrous metal, and regulating the proportions of said binary compound and said metal to obtain a titanium slag containing the oxide of said metal, said slag being substantially free from iron, the oxides of the slag being in monomolecular proportions.

3. A process of forming metallic iron and useful compounds of titanium from titanium ores which comprises forming a charge including titanium ore, a non-ferrous metal and silica, melting said charge and adding thereto to reduce iron present ferro-silicon, adjusting the proportions of said charge and said ferro-silicon to obtain by the melting substantially iron-free titanium slag of "sphene" type and to obtain metallic iron substantially free of titanium.

4. A process of forming metallic iron and useful compounds of titanium from titanium ores which comprises forming a charge including titanium ore, a divalent metal and silica, melting said charge and adding thereto to reduce iron present ferro-silicon, adjusting the proportions of said charge and said ferro-silicon to obtain by the melting titanium slag containing titanium oxide, oxide of said divalent metal and silica in "sphene" proportions and to obtain metallic iron substantially free from titanium.

5. A process of forming metallic iron and useful compounds of titanium from titanium ores which comprises forming a charge comprising titanium ore, a divalent non-ferrous metal, silica and ferro-titanium, melting said charge and adding thereto to reduce iron present ferro-silicon, adjusting the proportions of said charge and said ferro-silicon to obtain by the melting substantially iron-free titanium slag of "sphene" type and to obtain metallic iron substantially free of titanium.

6. A process of forming metallic iron and useful compounds of titanium from titanium ores which comprises forming a charge comprising titanium ore, calcium in the form of lime, silica and ferro-titanium, melting said charge and adding thereto to reduce iron present ferro-silicon, adjusting the proportions of said charge and said ferro-silicon to obtain by the melting substantially iron-free titanium slag consisting of titanium oxide, lime and silica in "sphene" proportions and to obtain metallic iron substantially free of titanium.

7. A process of forming metallic iron and useful compounds of titanium from titanium which comprises treating said ores at an elevated temperature with a binary compound of silicon adapted to act as a reducing agent at said elevated temperature and treating said ore with a non-ferrous metal, selecting said silicon compound to obtain a maximum difference between the respective specific gravities of the slag and of the iron, and regulating the proportion of said silicon compound and said non-ferrous metal to obtain a titanium slag containing the oxide of said metal, said slag being substantially free from iron and the oxides therein being in monomolecular proportions.

In testimony whereof we have signed our names to this specification.

DANIEL GARDNER.
LEONARD TAVERNER.